(12) United States Patent
Bastide et al.

(10) Patent No.: US 9,832,423 B2
(45) Date of Patent: Nov. 28, 2017

(54) DISPLAYING CONCURRENTLY PRESENTED VERSIONS IN WEB CONFERENCES

(75) Inventors: Paul Roger Bastide, Boxford, MA (US); Robert Edward Loredo, North Miami Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1410 days.

(21) Appl. No.: 12/826,938

(22) Filed: Jun. 30, 2010

(65) Prior Publication Data

US 2012/0005588 A1 Jan. 5, 2012

(51) Int. Cl.
*H04N 7/15* (2006.01)
*H04L 29/06* (2006.01)
*G06Q 10/10* (2012.01)

(52) U.S. Cl.
CPC ............... *H04N 7/15* (2013.01); *G06Q 10/10* (2013.01); *H04L 65/4038* (2013.01)

(58) Field of Classification Search
CPC .... G06F 21/31; G06F 3/0481; G06F 3/04886; G06F 21/36; H04L 29/0809
USPC .................................................. 715/741, 753
See application file for complete search history.

(56) References Cited

U.S. PATENT DOCUMENTS

| | | | | |
|---|---|---|---|---|
| 5,907,324 A | * | 5/1999 | Larson et al. | 715/753 |
| 6,076,166 A | * | 6/2000 | Moshfeghi et al. | 726/4 |
| 6,598,162 B1 | * | 7/2003 | Moskowitz | 713/176 |
| 7,188,314 B2 | * | 3/2007 | Mizrah | 715/741 |
| 7,379,968 B2 | * | 5/2008 | Schuh | 709/204 |
| 7,536,705 B1 | | 5/2009 | Boucher et al. | |
| 7,543,325 B2 | * | 6/2009 | Westbrook et al. | 725/93 |
| 7,552,334 B2 | * | 6/2009 | Bergh et al. | 713/176 |
| 7,792,262 B2 | * | 9/2010 | Parker | 379/202.01 |
| 7,908,663 B2 | * | 3/2011 | Horvitz et al. | 726/27 |
| 7,941,412 B2 | * | 5/2011 | Dunne et al. | 707/694 |
| 8,528,078 B2 | * | 9/2013 | Camaisa et al. | 726/22 |
| 2002/0104099 A1 | * | 8/2002 | Novak | 725/136 |
| 2003/0149696 A1 | * | 8/2003 | Nelson | G06Q 30/06 |
| 2003/0191805 A1 | * | 10/2003 | Seymour et al. | 709/204 |
| 2003/0222890 A1 | * | 12/2003 | Salesin et al. | 345/629 |
| 2006/0123455 A1 | * | 6/2006 | Pai et al. | 725/133 |
| 2007/0203980 A1 | * | 8/2007 | Andersen | 709/204 |
| 2007/0260683 A1 | * | 11/2007 | Hintermeister et al. | 709/204 |
| 2008/0126953 A1 | * | 5/2008 | Davidson et al. | 715/753 |
| 2008/0222689 A1 | * | 9/2008 | Howcroft et al. | 725/110 |
| 2009/0106668 A1 | * | 4/2009 | Bodin et al. | 715/753 |
| 2009/0182888 A1 | * | 7/2009 | Westerink et al. | 709/231 |

(Continued)

*Primary Examiner* — Li Sun
(74) *Attorney, Agent, or Firm* — Fabian VanCott; Steven L. Nichols

(57) ABSTRACT

A method of providing a number of versions of a presentation in a web conference may comprise streaming at least two different versions of a presentation associated with a web conference over a network to at least one client device, and providing an option to the client device to view an alternative one of the versions. An associated computing system and computer program product are also described. Finally, a method of viewing a number of versions of a web conference presentation in a web conference may comprise, with a client device, joining a web conference presented over a network, and switching between at least two different versions of the presentation based on permissions assigned to a passcode.

22 Claims, 4 Drawing Sheets

(56) References Cited

U.S. PATENT DOCUMENTS

2010/0083118 A1* 4/2010 Barbee et al. ................ 715/733
2011/0321100 A1* 12/2011 Tofighbakhsh ................ 725/58
2013/0212707 A1* 8/2013 Donahue et al. ............... 726/29

* cited by examiner

DISPLAYING CONCURRENTLY PRESENTED VERSIONS IN WEB CONFERENCES

BACKGROUND

Aspects of the present specification relate in general to web conferencing, and more particularly, to simultaneously transmitting multiple versions of a web conference presentation to the participants of a web conference, and to allow a participant or attendee to switch between the versions of the web conference presentation as allowed by access information associated with the participant or attendee.

Extraordinary developments within the Internet and surrounding technologies have lead to advanced methods of communication. Technology has progressed such that it is now possible to effectively deliver audio streams, video streams, and data over the Internet to create virtual conference rooms for the sharing of information of almost any form. Web conferencing is one method of utilizing this technology.

Web conferencing is becoming a prevalent means of communicating information between several individuals or groups by providing a means for these individuals and groups to conduct live meetings and give presentations among any number of dispersed locations via a network like the Internet. A web conferencing system provides a user with the ability to deliver slide show presentations, answer questions presented during the conference, share documents, or otherwise provide participants with information on any topic.

Often times it is necessary to provide several versions of a presentation to multiple participants in a web conference. This is due to the different needs, backgrounds, and interests of different individual participants. The presenter or presenters could deliver the different versions of the presentation illustrating different content reflecting the different needs, backgrounds, and interests of the participants in two separate sessions. However, this could be time consuming because it would require the presenter to hold, and individuals to attend the two different sessions. As another potential solution, the different versions of the presentation could be delivered concurrently. However, this too poses a problem in that the delivery of two separate versions of a presentation could be confusing to a listener due to the overlap of concurrent information.

BRIEF SUMMARY

A method of providing a number of versions of a presentation in a web conference comprises streaming at least two different versions of a presentation associated with a web conference over a network to at least one client device, and providing an option to the client device to view an alternative one of the versions. A computing system comprises a processor, and a memory communicatively coupled to the processor, in which the processor is configured to stream at least two different versions of a presentation over a network during a web conference to at least one client device, and provide an option to the client device to view an alternative one of the versions. A computer program product for providing a number of versions of a web conference presentation concurrently the computer program product comprising a computer readable storage medium having computer readable code embodied therewith, the computer readable program code comprising computer readable program code configured to stream at least two different versions of a web conference presentation over a network to at least one client device, and providing an option to the client device to view an alternative one of the versions. A method of viewing a number of versions of a web conference presentation in a web conference comprises, with a client device, joining a web conference presented over a network, and switching between at least two different versions of the presentation based on permissions assigned to a passcode.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
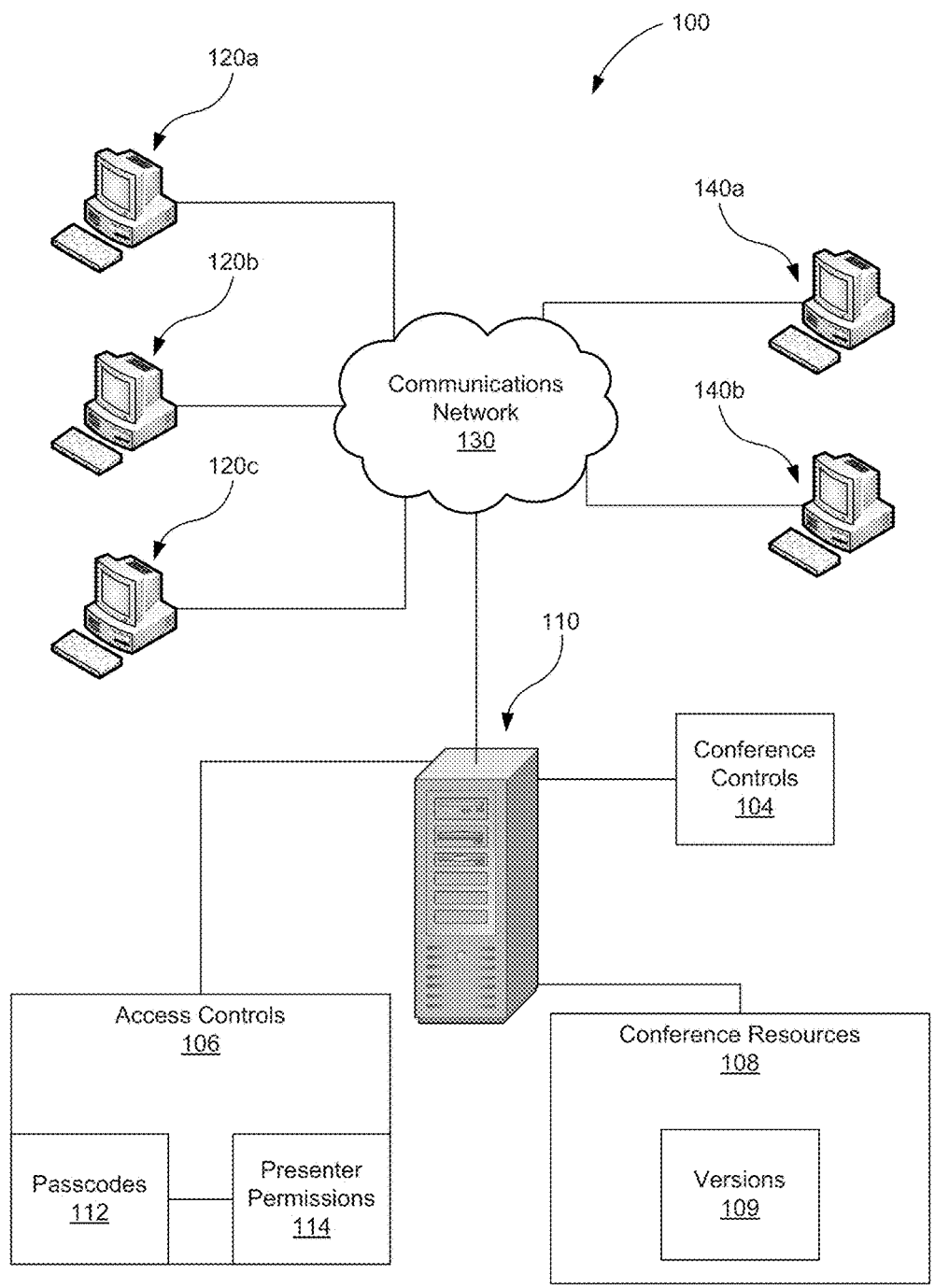
FIG. 1 is a block diagram of an illustrative system for displaying concurrently presented versions in a web conference, according to one exemplary embodiment of principles described herein.

As mentioned above, it is often necessary to provide several versions of a presentation to multiple participants in a web conference due to the individual participant's expected needs, backgrounds, and interests. The present specification discloses a web conferencing system for simultaneously transmitting multiple versions of a web conference presentation to the participants of a web conference, and allowing a participant or attendee to switch between the versions of the web conference presentation as allowed by access information associated with the participant or attendee.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable; RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Definition of Terms

As used in the present specification and the appended claims, the term "web conference" is meant to be understood broadly as any interactive workshop, lecture, or seminar that is delivered over a computer network, particularly, the World Wide Web. The information delivered or presented in a web conference may be of any form and regard any subject. Further, the system employed in web conferencing may be configured to present information using a slide show presentation application, a streaming audio application, a streaming video application, an instant messaging application, a file sharing application, a collaborative task management application, a desktop sharing application, a data visualization application, a survey application, and a voice over internet protocol (VoIP) application, among others. Further, the system may be configured to present information using any combination of these.

Further, as used in the present specification and the appended claims, the term "presenter" is meant to be understood broadly as any individual or group of individuals designated as the person or persons that deliver a presentation. Generally, one or more presenters deliver a presentation within the web conference to attendees or participants who are located at any number of different locations.

Still further, as used in the present specification and the appended claims; the terms "attendee" or "participants" is meant to be understood broadly as any individual or number of individuals participating in a web conference as receivers of information from a source. The source may be an individual or number of individuals such as a mediator or presenter, a computing device such as a server, or any other source from which information may be received. Typically, a presenter will be operating a computing device that is the electronic source of the presentation.

As used in the present specification and the appended claims, the term "network" is meant to be understood broadly as any configuration in which two or more locations are in electronic communication for the purpose of exchanging data. The locations may include one or more computing devices such as servers, presenter devices, or client devices, among others, to allow for the exchange of data from one entity or user to another entity or user.

As used in the present specification and the appended claims, the term "version" or the phrases "versions of a web conference presentation," "versions of a presentation," and "versions of information," are meant to be understood broadly as information or a set of information that has a relationship to a subject being presented in a web conference in at least one aspect. The web conference may discuss a particular subject of which a number of versions of the web conference are related to the overall subject of web conference in at least one aspect.

Further, as used in the present specification and the appended claims, the term "passcode" is meant to be understood broadly as a specific string of numbers, symbols, and/or characters used by a program, computer operator, or user to access a system and the information stored within it. Thus, the passcode may include a password, a password phrase, a username, and combinations of these, among others.

With reference now to FIG. 1, a block diagram of an illustrative system (100) for displaying a number of versions of a web conference presentation (109) in a web conference, according to one exemplary embodiment of principles described herein is illustrated. In one exemplary embodiment, the system (100) may include a web conference server (110). The web conference server (110) may be any combination of software and/or hardware that provides services to other software programs or other computers including any combination of software and/or hardware capable of servicing Hypertext Transfer Protocol (HTTP) requests. Further, the web conference server (110) may include a processor (not shown) for processing requests from other devices. Memory (not shown) may also be provided within the web conference server (110) for the storage of information such as web conference resources (108), passcodes (112), and presenter permissions (114) as will be discussed in more detail below.

The web conference server (110) may include conference controls (104) that allow for an administrator, mediator, presenter, or other user to control functions of the web conference. These functions may include, for example, scheduling of the web conference, management of the list of attendees or participants in the web conference, sending out web conference invitations, sending out reminders of the web conference, convening the web conference, adjourning the web conference, admitting attendees or participants, excluding specific attendees or participants, and designating a number of presenters, among other functions.

The web conference server (110) may also include access controls (106) that govern access to web conference resources (108) (e.g., slide show presentations, images, streaming video, streaming audio, etc.) according to passcodes (112) and presenter permissions (114) given to attendees. Access controls (106) determine, according to assigned permissions, which aspects of the web conference can be controlled or received by attendees or other participants. The access controls (106) may, for example, refuse attendee requests for access to unauthorized functions or disable user interface features that provide access to authorized functions. The access controls (106) may also allow or restrict attendees' access to information including one or more versions of a web conference presentation (109), as will be discussed in more detail below.

The system (100) may further include a number of client devices (120a, 120b, 120c) and presenter devices (140a, 140b) communicatively coupled to the web conference server (110) via a communications network (130). Although only three client devices (120a, 120b, 120c) are depicted in FIG. 1, those of ordinary skill in the art will immediately understand that any number of client devices may be included in the system (100). Similarly, although only two presenter devices (140a, 140b) are depicted in FIG. 1, those of ordinary skill in the art will immediately understand that any number of presenter devices (140a, 140b) may be included in the system (100).

The client devices (120a, 120b, 120c) and presenter devices (140a, 140b) may be any number of devices configured to send and receive data through a network. Thus, the several client devices (120a, 120b, 120c) and presenter devices (140a, 140b) may be, for example, desktop computers, laptop computers, handheld computers, personal digital assistants (PDA's), and wireless phones including smart phones, among others. The client devices (120a, 120b, 120c) are accessed and used by attendees who wish to participate in the web conference. The presenter devices (140a, 140b) are accessed and used by presenters in order to deliver presentations to the attendees by using the web conference resources (108) prepared and stored on the web conference server (110).

The communications network (130), in light of the above definition, may be any network formed by the communicative coupling of the client devices (120a, 120b, 120c), the presenter devices (140a, 140b), and the web conference server (110). For example, the communications network (130) may be an intranet, a wide area network (WAN), a local area network (LAN), a virtual private network (VPN), the Internet, or any suitable communications network.

Figure 2:
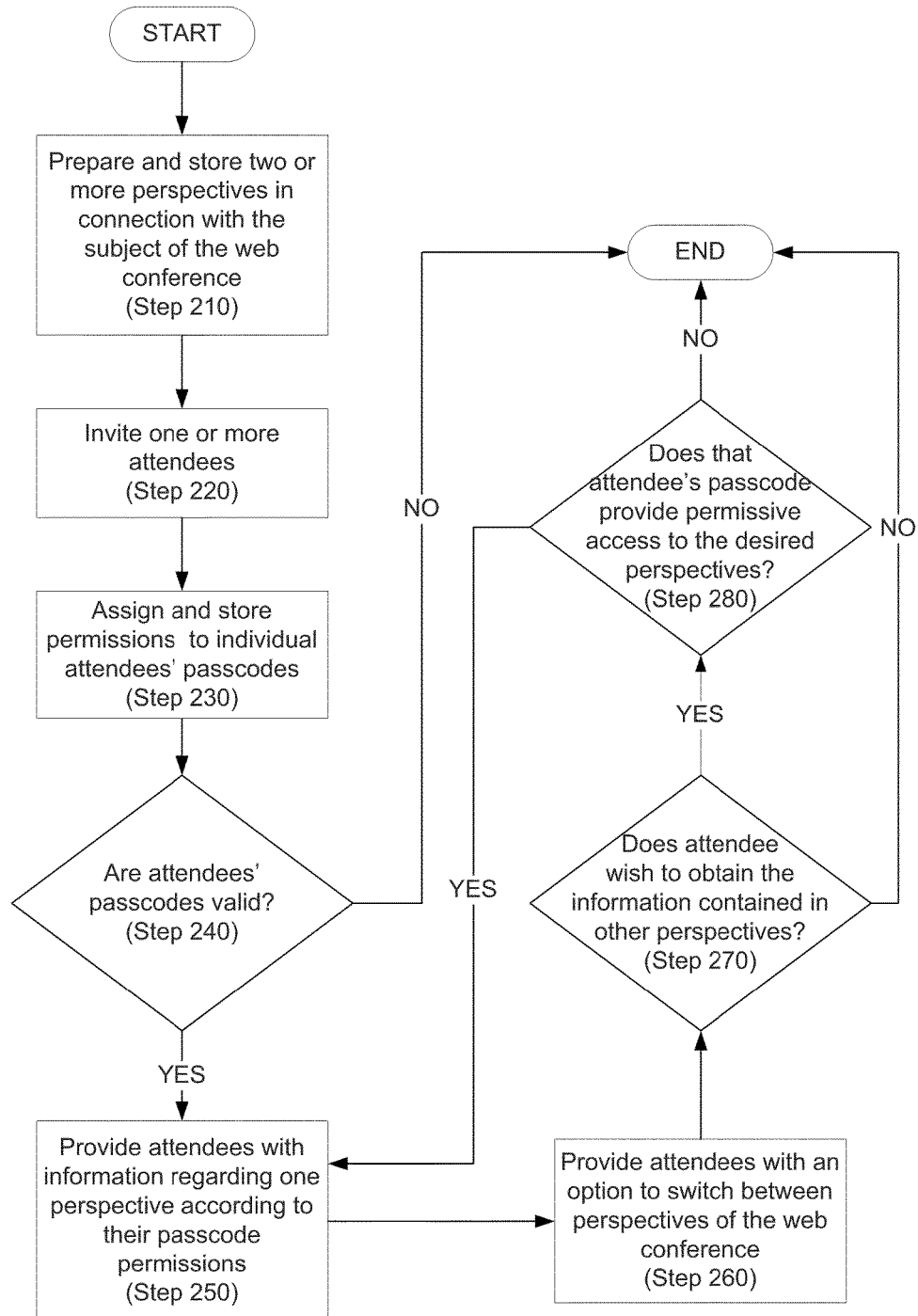
FIG. 2 is a flowchart showing an illustrative web conferencing method allowing for switching between concurrently presented versions, according to one exemplary embodiment of principles described herein.

FIG. 2 is a flowchart showing an illustrative web conferencing method allowing for switching between concurrently presented versions of a web conference presentation (109), according to one exemplary embodiment of principles described herein. With regard to both. FIGS. 1 and 2, a presenter or group of presenters may wish to present information to a number of attendees of a web conference surrounding a main subject. In one exemplary embodiment, the presenters may prepare two or more versions of a web conference presentation (109) in connection with the subject of the web conference. (FIG. 2, step 210). The presenters may prepare the versions (109) of the web conference, access a web conference server (110) via the presenter devices (140a, 140b), and store the versions (109) and other information intended to be provided to the attendees on the web conference server (110) as web conference resources (108) (FIG. 2, step 210).

Once the versions (109) of the web conference have been prepared and stored on the web conference server (110) (FIG. 2, step 210), the presenters may then invite one or more attendees to participate in the web conference (FIG. 2, step 220). This may be performed via e-mail or other messaging services. In inviting the attendees to participate in the web conference, the presenters may provide each attendee with an individualized passcode (112) or other verification information to allow the attendees to logon to the web conference via the client devices (120a, 120b, 120c). These passcodes (112) may then be stored in the web conference server (110) for later verification as the attendees logon to the web conference.

With regard to the passcode (112), the presenters may then assign permissions (114) to the attendees' individual passcodes (112) and store the permissions (114) in the web conference server (110) as the presenter permissions (114) (FIG. 2, step 230). The permissions (114) associated with the passcodes (112) allow or restrict the attendees' access to one or more versions (109) of the web conference. If, for example, three versions (109) in connection with the subject of the web conference were prepared by the presenters, the permissions (114) associated with one attendee's passcode (112) may provide the attendee with access to two of the three versions (109) while restricting access to the third version (109). Further, in another embodiment, the permissions (114) assigned to the passcodes (112) may further define a default version (109) for each individual passcode (112). The default version (109) is the version (109) the attendee will be provided with when he or she begins participating in the web conference.

Once the presenters have assigned permissions (114) to the attendees' passcodes (112), and stored the passcodes (112) and permissions (114) in web conference server (110) (FIG. 2, Step, 230), the presenters and attendees may attend the web conference at the appropriated time. An attendee who wishes to join the web conference may do so by logging onto the web conference through his or her client device (120a, 120b, 120c). This may be performed by, for example, inputting the passcode (112) into his or her client device (120a, 120b, 120c). The passcode (112) is then sent to the web conference server (110) for validation by the access controls (106). The access controls (106) determine whether the passcode (112) provided by the attendee at the client devices (120a, 120b, 120c) is valid by comparing the passcode (112) entered by the attendee with the passcodes (112) stored at the web conference server (110) (FIG. 2, Step 240). If the access controls (106) determine that the passcode (112) is valid, access to the web conference is permitted, (FIG. 2, Step 240, determination YES) and the web conference server (110) provides access to the web conference resources (108) (FIG. 2, step 250). Access to the web conference resources (108) includes access to at least one default version (109) of the web conference. If the access controls (106) determine that the passcode (112) is not valid, access to the web conference and web conference resources (108) is not permitted and the process terminates (FIG. 2, Step 240, determination NO).

Once permitted access to the web conference, the attendee may be given the option to view a number of versions of a web conference presentation (109) (Step 260). As discussed above, it may be desirable for a number of presenters to simultaneously present a number of different versions (109) of a web conference subject to the attendees within the web conference using the number of presenter devices (140a, 140b). This is due to the possibility that the various attendees have differing backgrounds or interests that require different versions (109) to be presented to the attendees. Thus, although the web conference may cover any particular topic or subject matter, it is often necessary and convenient to simultaneously present or make available two or more versions (109) of that particular topic or subject matter within a web conference to the attendees in order to ensure that the attendees are as well informed about the subject of the web conference as possible.

This aspect of the present specification may be best described using an exemplary situation. In one exemplary embodiment, the topic of the web conference may pertain to a company's introduction of a new product. The various attendees may be interested in or need only certain information pertaining to their role in developing or distributing the new product. In this example, a first attendee using client device (120a) may be assigned by the company to market the new product, and may be interested in, for example, the sales aspects of the new product in order to determine or develop a marketing strategy. A second attendee using client device (120b) may be an engineer for the company, and may be interested in the technical aspects of the product in order to further develop the new product or otherwise improve upon the new product. Still another attendee using client device (120c) may be a lawyer interested in the potential liability aspects of the new product. In this example, three different versions (109) of the product relating to (1) marketing, (2) product development, and (3) product liability surrounding the main topic of the new product may be prepared by the presenters and simultaneously delivered by a number of presenters to these three attendees, respectively.

Further, as mentioned above, it is often convenient or necessary for a particular attendee to receive information other than, or in addition to the version (109) he or she is currently receiving. Thus, it may be convenient or necessary for a particular attendee to switch between the various versions of a web conference presentation (109) in order to be better informed on the topic of the web conference (FIG. 2, step 260). For example, the first attendee in the example above may desire to know more about the potential liability of the product in order to best determine a market strategy. Accordingly, the first attendee may desire or need to receive the information that the third attendee is receiving. Therefore, presenter permissions (114) may be assigned to allow the first attendee to access the version of the web conference presentation (109) regarding product liability.

Similarly, the second attendee may need to know more about the products potential liabilities in order to develop an improved product that does not suffer from the deficiencies that has caused the new product to fall short of expectations or bring about the potential liability to the company. In this situation, the second attendee may also desire or need to receive the information that the third attendee is receiving. Therefore, presenter permissions (114) may be assigned to allow the second attendee to also access the version regarding product liability.

Finally, the third attendee in the example above may wish to know more about the technical aspects of the new product to better understand the reason why the new product has the potential liability. Accordingly, the third attendee may desire or need to receive the information that the first attendee is receiving. Therefore, presenter permissions (114) may be assigned to allow the third attendee to access the version of the web conference presentation (109) regarding product development.

In light of the need to allow for the attendees to view more than one version (109) of the web conference presentation, the system (100) may be configured to allow the attendees to switch between these versions (109). Further, in one exemplary embodiment, the system (100), and, more particularly, the access controls (106) and presenter permissions (114) may permit the various attendees to receive information regarding one or more versions (109) based on the attendees' passcodes (112) provided when the attendees logon to the web conference.

This is achieved by providing the attendees with an option to switch between the number of versions (109) of the web conference (step 260). In one exemplary embodiment, a user interface may be provided as software, hardware or combinations thereof to the attendees at the attendees' client devices (120a, 120b, 120c). For example, the user interface may be a combination of the attendees' respective computing devices and software provided over the communications network (130) through which the attendees may request access to the different versions (109) and receive the information in connection with the different versions (109).

In one exemplary embodiment, a determination may be made as to whether an attendee wishes to obtain the information connected to alternative versions (109) of the web conference (FIG. 2, step 270). If the attendee does not wish to obtain the information connected to an alternative version (109) (FIG. 2, step 270, determination NO), then the attendee may finish participation in the web conference without access to alternative versions of a web conference presentation (109).

Conversely, if the attendee wishes to obtain the information connected to an alternative version (109) (FIG. 2, step 270, determination YES), then the web conference server (110) may be configured to determine if the attendee's passcode (112) provides him or her with permissive access to the desired version (109) (FIG. 2, step 280). This is achieved by submitting the attendee's passcode (112) to the web conference server (110), and, in particular, to the access controls (106). Access to alternative versions of a web conference presentation (109) is based on the presenter permissions (114) assigned to the attendees' passcodes (112).

In one exemplary embodiment, the passcode (112) used to determine permissive access to the alternative versions of a web conference presentation (109) may be the same passcode (112) used to logon to the web conference. In another exemplary embodiment, the passcode (112) used to determine permissive access to the alternative versions (109) may be a different passcode (112) provided to the attendees.

If the system determines the attendee's passcode (112) does not provide him or her with permissive access to the desired version (109) (FIG. 2, step 280, determination NO), then the attendee may finish participation in the web conference without access to alternative versions (109). Conversely, if the system determines the attendee's passcode (112) does provide him or her with permissive access to the desired version (109) (FIG. 2, step 280, determination YES), then web conference server (110) returns back to step 250 of the method, and the web conference server (110) provides the attendee with access to the alternative version (109) or versions (109) from the web conference resources (108). The process of allowing an attendee to request alternative versions (109) (FIG. 2, step 270), determine the presenter permissions (114) in connection with the attendee's passcode (112) (FIG. 2, step 280), and provide the attendee with access to the alternative versions (109) from the web conference resources (108) may be performed as often as is necessary, restricted only by the presenter permissions (114) associated with the attendee's passcode (112) and the number of versions (109) available for viewing.

Figure 3:
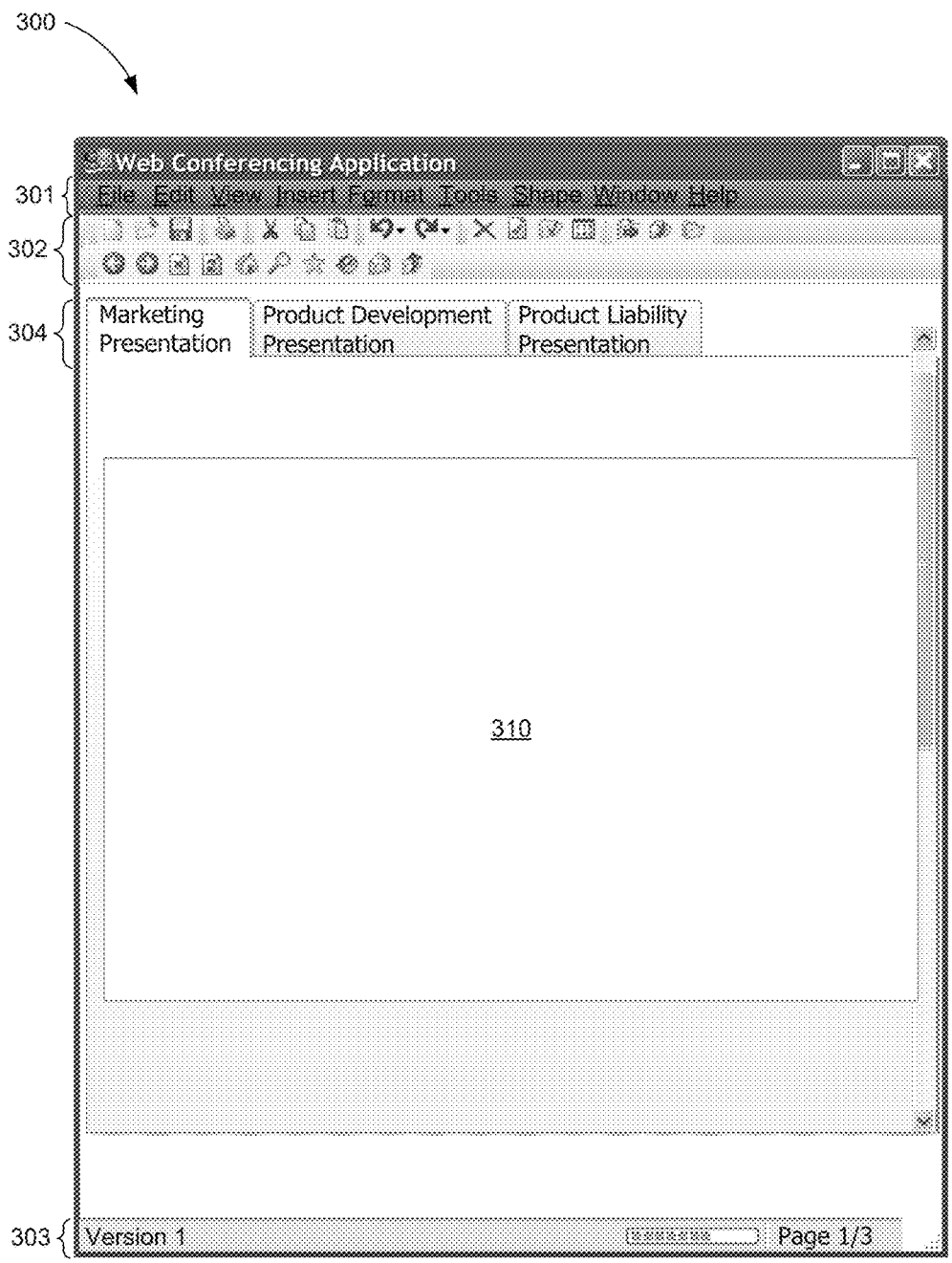
FIG. 3 is a diagram of a display page of a web conferencing application according to one exemplary embodiment of the principles described herein.
Figure 4:
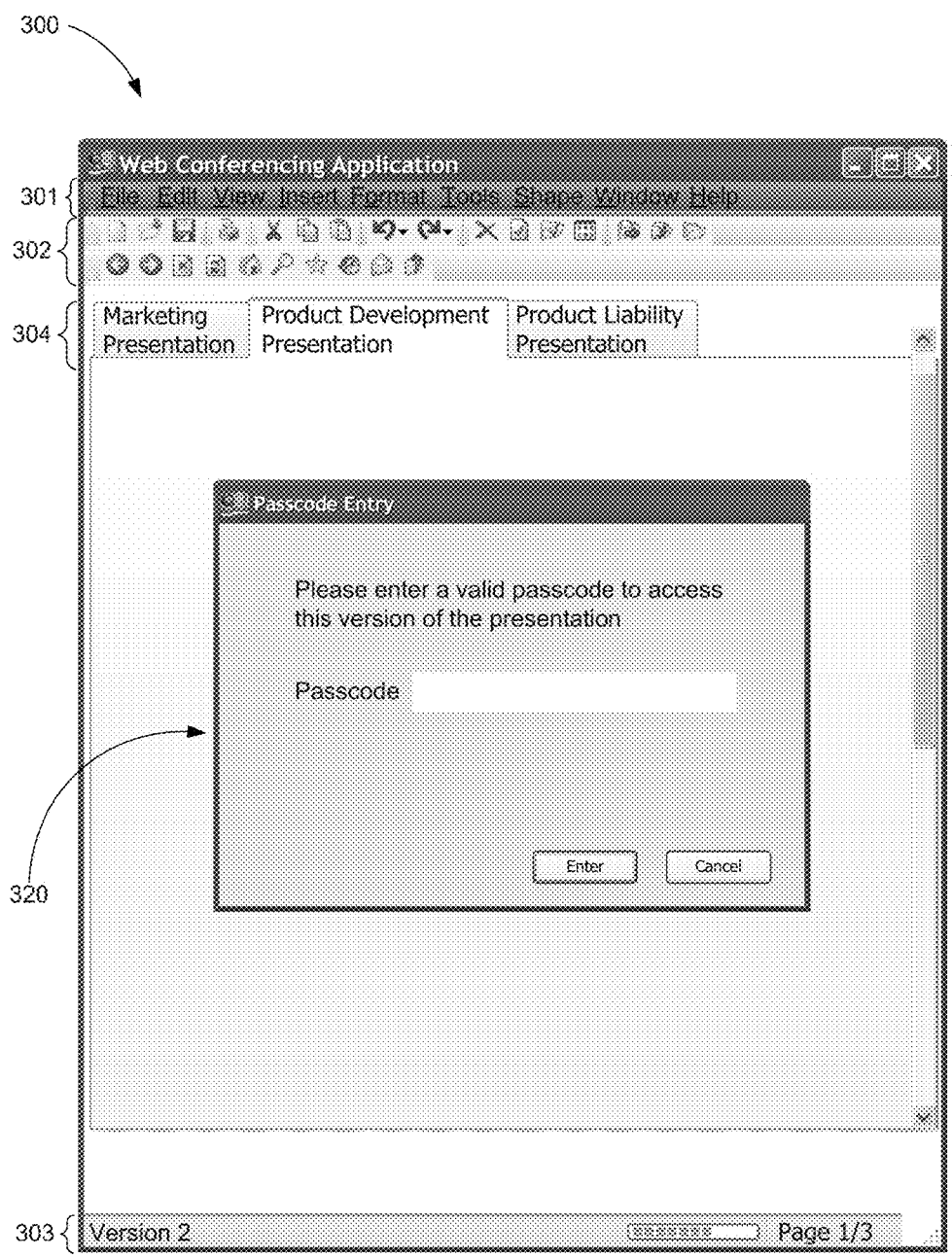
FIG. 4 is a diagram of a display page of a web conferencing application after accessing an additional version of the presentation according to one exemplary embodiment of the principles described herein.

Turning now to FIGS. 3 and 4, FIG. 3 is a diagram of a display page (300) of a web conferencing application according to one exemplary embodiment of the principles described herein. FIG. 4 is a diagram of a display page (300) of a web conferencing application after accessing an additional version (109) of the presentation according to one exemplary embodiment of the principles described herein. In one exemplary embodiment, the display page (300) may be embodied as a number of windows configured to display portions of the web conference and provide for the functionality relating to the principles described herein. Further, the display page (300) may include any number of buttons, icons, menus, or other input or output elements for carrying out the various functions of the web conferencing application.

As depicted in FIGS. 3 and 4, the display page (300) may include a menu bar (301), a toolbar (302), and a status bar (303). The menu bar (301) may include any window or application specific menus that provide access to functions such as opening files, interacting with an application, or help resources. The toolbar (302) may include any number of buttons, icons, or other input or output elements for carrying out the various functions of the web conferencing application. Finally, the status bar (303) may be configured to display any information about the current state of the current window including tabs currently being viewed, progress of a task, such as a download or file transfer, and a page currently being viewed, among others.

FIGS. 3 and 4 further depict a number of version tabs (304). The version tabs (304) are configured to allow a user to switch between different versions of a web conference presentation. As depicted in FIG. 3, the first tab has been selected. Thus, the Marketing version of the presentation discussed in the example above will be displayed for the user. Selection of other version tabs (304) will allow a user to switch to, for example, the Product Development Presentation the Product Liability Presentation.

Once a tab (304) is selected, a version of the presentation is displayed on a portion of the window; namely, a viewing screen (310). Any type of information may be displayed in the viewing screen (310) in accordance with the version of the presentation (109) selected. When a user desires to view another of the additional versions (109) of the presentation, the user may select another of the version tabs (304). In one exemplary embodiment, upon selection of another version tab (304), the web conferencing application may prompt the user to enter a passcode by displaying a passcode entry window (320). Before access to the additional version (109) is permitted, the system may require the user to enter a passcode as discussed above. Further, as discussed above, the passcode may be the same passcode used to logon to the web conference.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of providing a number of versions of a presentation in a web conference comprising:
concurrently transmitting at least two different versions of a presentation associated with a web conference over a network to at least one client device;
assigning permission to the client device, the permission defining access of the client device to a number of the at least two different versions of the presentation based on a passcode associated with the client device;
providing the client device with a default version of the presentation, the default version of the presentation being assigned to the passcode, wherein:
the default version is one of the at least two different versions of the presentation the client device is provided with when participation in the web conference begins, and
the default version is assigned based on at least one characteristic of a participant associated with the client device;
receiving a request from the client device to switch to a second version of the presentation;
determining whether the client device is permitted to select an alternate version of the presentation based on the permission; and
switching transmission of the default version of the presentation to the second version of the presentation based on the permission, the switching requiring a switching passcode different from the passcode to switch from the default version of the at least two different versions of the presentation to the at least one second version of the presentation.

2. The method of claim 1, further comprising associating the at least two different versions of said presentation with the at least one client device based on a presenter's assignment of access to the at least two different versions.

3. The method of claim 2, further comprising requiring entry of the passcode by the client device before allowing the client device to view the at least one second version.

4. The method of claim 1, wherein, if the permissions do not allow for the viewing of the at least one second version of the presentation, then restricting the client device's access to the at least one second version of the presentation.

5. The method of claim 1, in which the web conference comprises at least one of a slide show presentation, a streaming audio presentation, a streaming video presentation, instant messaging, file sharing, desktop sharing, collaborative task management, data visualization, a chat session, and a survey.

6. The method of claim 1, further comprising storing the assigned permissions in memory.

7. The method of claim 1, further comprising requiring the passcode from a client device before permitting that client device to join the web conference.

8. The method of claim 7, further comprising selecting at least one of the versions of said presentation for transmission to the client device based on permissions assigned to the passcode provided from that client device.

9. A computing system comprising:
a processor;
a memory communicatively coupled to said processor;
said processor to:
stream at least two different versions of a presentation over a network during a web conference from a presenter device to a client device;
provide the client device with a default version of the presentation, the default version of the presentation being assigned to a passcode, wherein:
the default version is one of the at least two different versions of a presentation the client device is provided with when participation in the web conference begins, and
the default version is assigned based on at least one characteristic of a participant associated with the client device,
provide an option to the client device to view an alternative one of the versions, and
in response to a request from the client device to view the alternative one of the versions, requesting entry of a switching password different from the passcode in order to switch from the default version to the alternative one of the versions; and
presenter permissions to allow a presenter to assign permissions to the passcode to view the alternative one of the versions.

10. The computing system of claim 9, further comprising access controls configured to determine validity of an entry of the passcode before the client device is permitted to join the web conference.

11. The computing system of claim 10, further comprising conference resources configured to provide at least one of the versions to the client device based on permissions assigned to the passcode.

12. The computing system of claim 11, further comprising requiring entry of the passcode by the client device before allowing the client device to view an alternative one of the versions.

13. The computing system of claim 9, further comprising access controls configured to determine whether the client device is permitted to view the alternative version based on the permissions assigned to the passcode.

14. The computing system of claim 13, wherein, if permissions assigned to the passcode allow for the viewing of an alternative one of the versions, then permitting the client device to view the alternative version.

15. The computing system of claim 13, wherein, if permissions assigned to the passcode do not allow for the viewing of an alternative one of the versions, then restricting the client device's access to the alternative version.

16. The computing system of claim 9, in which the versions of the presentation of the web conference comprises at least one of a slide show presentation, a streaming audio presentation, a streaming video presentation, instant messaging, file sharing, desktop sharing, collaborative task management, data visualization, a chat session, and a survey.

17. The computing system of claim 9, wherein the network comprises at least one of an intranet, a wide area network (WAN), a local area network (LAN), a virtual private network (VPN), and the Internet.

18. A computer program product for providing a number of versions of a web conference presentation concurrently, the computer program product comprising:
a computer readable storage medium having computer readable code embodied therewith, said computer readable program code to:

simultaneously stream at least two different versions of a web conference presentation during a single web conference over a network to a client device;
provide the client device with a default version of the web conference presentation, the default version of the web conference presentation being assigned to a passcode, wherein:
 the default version is one of the at least two different versions of the presentation the client device is provided with when participation in the web conference begins, and
 the default version is assigned based on at least one characteristic of a participant associated with the client device;
provide an option to the client device to view an alternative one of the versions;
associate one of said versions of said presentation with a passcode to be received from the client device joining said web conference;
in response to a request from the client device to view the alternative one of the versions, requesting entry of a switching password different from the passcode in order to switch from the default version to alternative one of the versions, and
determine via access controls whether the client device is permitted to view the alternative version based on the permissions assigned to the passcode,
wherein, if permissions assigned to the passcode allow for the viewing of an alternative one of the versions, then permitting the client device to view the alternative version, and
wherein, if permissions assigned to the passcode do not allow for the viewing of an alternative one of the versions, then restricting the client device's access to the alternative version.

19. A method of viewing a plurality of versions of a presentation in a single web conference comprising:
 with a client device, joining a web conference presented over a network;
 provide the client device with a default version of a plurality of different versions of a presentation, the default version of the presentations being assigned to a passcode, wherein:
  the default version is one of the plurality of different versions of the presentation the client device is provided with when participation in the web conference begins, and
  the default version is assigned based on at least one characteristic of a participant associated with the client device, and
 switching between at least two different versions of the presentation based on permissions assigned to the passcode in response to a request from the client device to view one of the plurality of different versions of the presentation, requesting entry of a switching password different from the passcode in order to switch from the default version to one of the plurality of different versions of the presentation.

20. The method of claim 19, wherein switching between at least two different versions of the presentation based on permissions associated with a passcode comprises:
 requesting a web conference server for access to an alternative one of the versions;
 entering a passcode to determine if the permissions assigned to the passcode allows the client device to access the alternative one of the versions.

21. The method of claim 20, wherein, if permissions assigned to the passcode allow for the viewing of an alternative one of the versions, then accessing the alternative version.

22. The method of claim 19, further comprising requiring a switching passcode to switch from the default version of the at least two different versions of the presentation to the at least one second version of the presentation, the switching passcode being different from the passcode.

* * * * *